United States Patent [19]

Schaller

[11] Patent Number: 4,697,706

[45] Date of Patent: Oct. 6, 1987

[54] LIFE SPOTTING DISTRESS SIGNAL PACKAGE

[76] Inventor: Donald L. Schaller, 13623 Blue Ridge Ave., P.O. Box 76, Blue Ridge Summit, Pa. 17214

[21] Appl. No.: 928,011

[22] Filed: Nov. 7, 1986

[51] Int. Cl.$^4$ ............................................... B64B 1/40
[52] U.S. Cl. ..................... 206/573; 116/210; 116/DIG. 8; 116/DIG. 9; 206/499; 206/803; 244/33
[58] Field of Search ............... 206/223, 573, 803, 499; 244/31, 33; 116/DIG. 8, DIG. 9, 210; 342/10

[56] References Cited

U.S. PATENT DOCUMENTS

| | | | |
|---|---|---|---|
| 2,395,006 | 2/1946 | Leslie | 116/210 X |
| 2,821,725 | 2/1958 | Harper | 116/210 X |
| 2,863,531 | 12/1958 | Walker . | |
| 3,002,490 | 10/1961 | Murray | 116/DIG. 9 |
| 3,171,128 | 2/1965 | Shattuck | 116/DIG. 9 |
| 3,187,712 | 6/1965 | Pritchard et al. . | |
| 3,721,983 | 3/1973 | Sherer . | |
| 3,727,229 | 4/1973 | Clinger et al. | 116/210 X |
| 3,735,723 | 5/1973 | Lutz . | |
| 3,746,285 | 7/1973 | Mango . | |
| 3,796,181 | 3/1974 | Collins . | |
| 3,881,531 | 5/1975 | Rossi | 116/DIG. 9 |
| 3,938,151 | 2/1976 | Trenam | 342/10 |
| 3,938,466 | 2/1976 | Crissman . | |
| 3,941,079 | 3/1976 | McNeill | 116/210 |
| 3,945,591 | 3/1976 | Carveron | 244/31 |
| 3,951,260 | 4/1976 | Frazee | 206/223 |
| 3,964,427 | 6/1976 | Murphy | 116/210 |
| 4,044,711 | 8/1977 | Jamison . | |
| 4,120,259 | 10/1978 | Wilson . | |
| 4,281,427 | 8/1981 | Petters | 116/210 X |
| 4,416,433 | 11/1983 | Bellina | 244/33 |
| 4,586,456 | 5/1986 | Forward | 116/210 |

FOREIGN PATENT DOCUMENTS

| | | | |
|---|---|---|---|
| 0000954 | 11/1979 | Belgium | 206/573 |
| 2447729 | 10/1980 | France | 116/DIG. 9 |

*Primary Examiner*—Stephen Marcus
*Assistant Examiner*—Bryon Gehman

[57] ABSTRACT

The present disclosure is directed to life spotting package comprising a lighter than air inflatable cylindrical device of an international orange composite having an inflated diameter of the order of one foot in diameter and a length of the order of five feet. A mirror finish helical strip of highly light reflective material runs from the top of the cylinder and winding axially 360° down and around the cylinder to its bottom. The cylinder is of a metallic foil over plastic composite and is radar reflective. The bottom of the cylinder has an apron for the attachment of signaling devices by way of grommet eyelets and velcro patches. The cylinder is provided by a helium charged no return cannister. There is provision for introducing the helium from the cannister into the inflatable cylindrical device making the cannister part of the airborne lighter than air cylindrical device. A length of nonconductive line is provided as a tether, one end of which is to be secured to the bottom of said inflatable cylindrical device and the other end of which is to be secured to a person to be rescued or an earth secured fixed object to identify the subject to be rescued identified by the airborne cylindrical device and a transport container retains said cylindrical device, helium cannister, helium introduction means and nonconductive line for transport by an individual.

1 Claim, 5 Drawing Figures

LIFE SPOTTING DISTRESS SIGNAL PACKAGE

TECHNICAL FIELD

My invention relates to helium inflated balloon devices to be deployed by persons in distress needing medical assistance and/or rescue which device may be visually spotted from great distances due to its international orange color, mirror reflective surfaces and which may be detected by radar.

BACKGROUND ART

Heretofore many balloon distress signal devices have been known such as the following U.S. patents:

| 1946 | A. Y. Leslie | U.S. Pat. No. 2,395,006 |
|---|---|---|
| 1958 | F. S. Walker | U.S. Pat. No. 2,862,531 |
| 1965 | G. F. Pritchard et al | U.S. Pat. No. 3,187 712 |
| 1973 | P. Lutz | U.S. Pat. No. 3.735,723 |
| 1973 | J. Mango | U.S. Pat. No. 3,746 285 |
| 1973 | O. Sherer | U.S. Pat. No. 3,721,983 |
| 1977 | L. L. Jamison | U.S. Pat. No. 4,044,711 |
| 1978 | G. W. Wilson | U.S. Pat. No. 4,120,259 |

DISCLOSURE OF THE INVENTION

In accordance with my invention, I provide a life spotting distress signal kit which may be carried by people traveling in remote areas in forests or woods, mountains, etc. which may become injured in ski accidents, hunting accidents, etc. and require immediate medical assistance and helicopter evacuation to hospital facilities. The main feature of the kit is an inflatable cylinder of a plastic and mirror finish mainly of international orange composite having a mirror finish top and a mirror helical stripe which will reflect any light from any angle or form any source striking it and being of a metallic foil over plastic composite will reflect or return any radar or radio signal beam striking it.

The cylindrical helium filled balloon when transported by a hiker, hunter or skier will be uninflated and rolled into a package or pouch which will also contain a cannister containing enough helium to fill the cylinder one time while providing it with enough lift to carry it to the full length of its tether which is a length of nonconductive line such as monofilament nylon or multifill line the end of which remote from the cylinder may be attached to a person or a ground object to locate the point of rescue to aircraft or search parties.

BEST MODE FOR CARRYING OUT THE INVENTION

Figure 1:
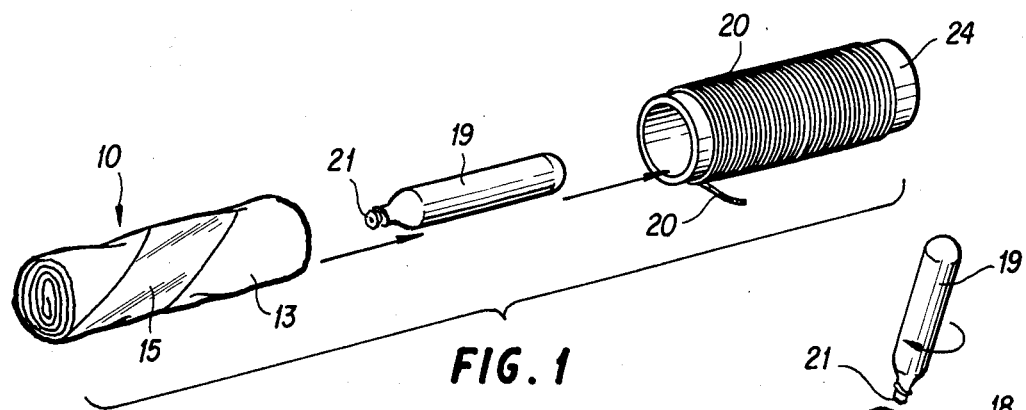
FIG. 1 is an exploded perspective view of the signal device of the present invention in collapsed condition.
Figure 2:
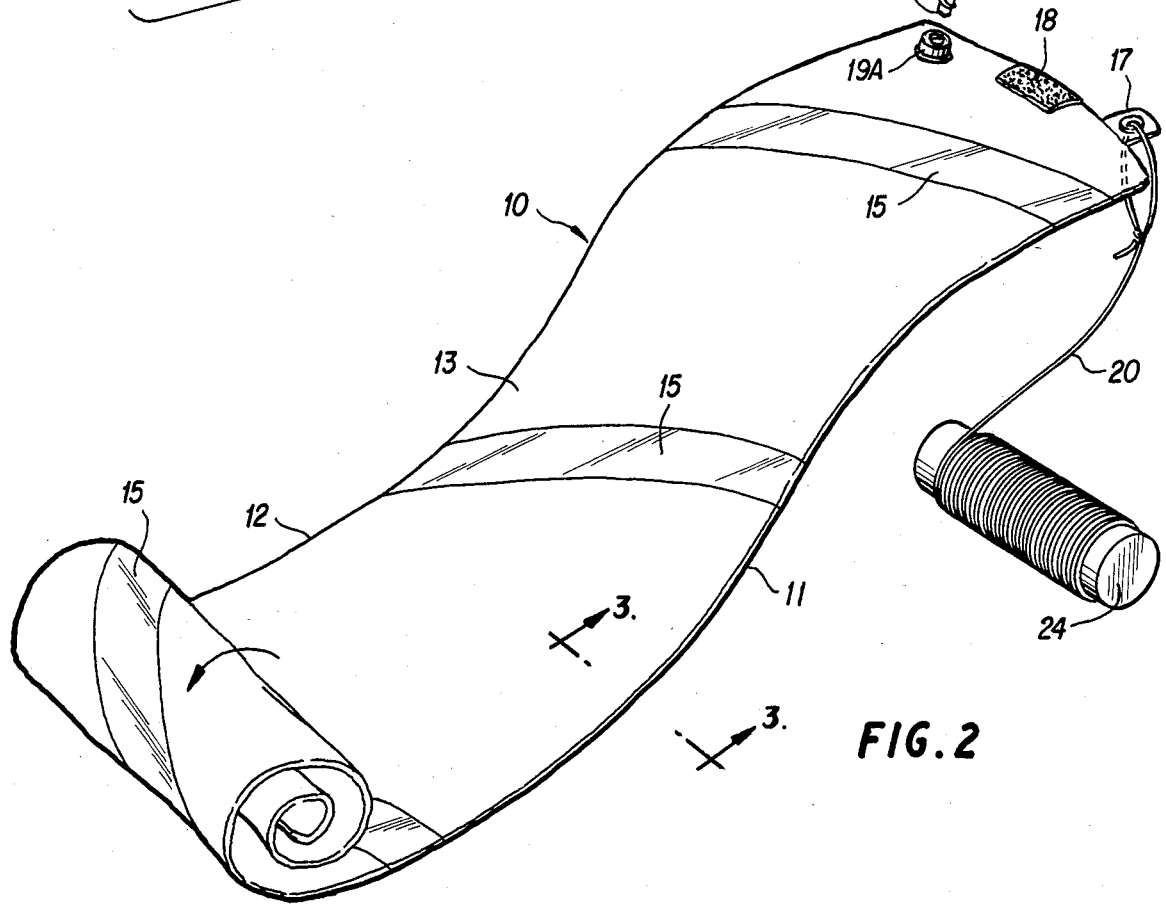
FIG. 2 is an enlarged perspective view of the signal device of FIG. 1 in a state of partial deployment.
Figure 3:
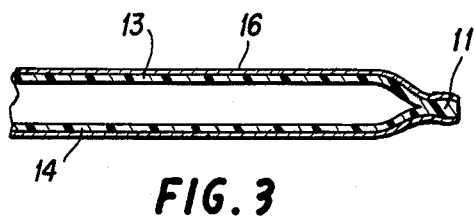
FIG. 3 is a fragmentary transverse sectional view of the inflatable cylindrical device showing the plastic composite interior and the mirror finish strip of light reflective material.

The life spotting package constructed in accordance with the present invention is best seen in its knock down collapsed condition shown in FIGS. 1 and 2 in which the cylindrical device 10 is shown rolled in a compact roll 10, in FIG. 1, and partially unrolled in FIG. 2. Two longitudinal welded seams 11, 12 join two plastic panels 13, 14 of international orange plastic having a mirror finish metallic helical strip 15 of a highly light reflective material 16 running from the top to the bottom of the cylinder and winding 360° spirally about the cylinder 10 from its top to its bottom.

The cylinder is of a metallic foil over plastic composite being radar reflective. Located at the bottom of the cylinder 10 are tabs 17 and Velcro patches for 18 for the attachment of electronic signaling devices (not shown) for sending out distress signals.

Figure 4:
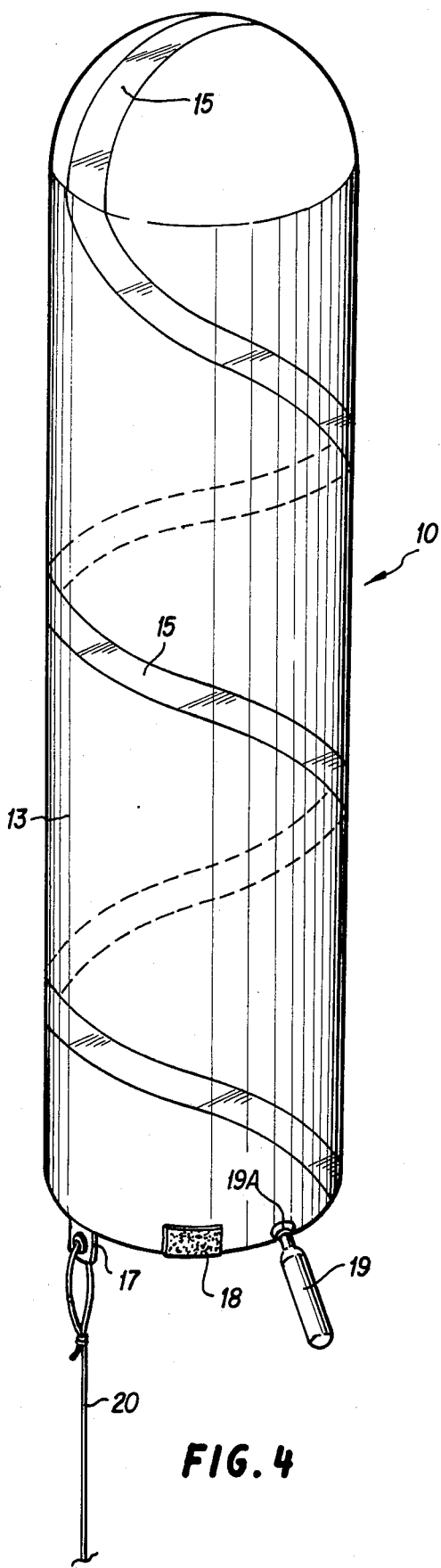
FIG. 4 is a perspective view of the helium inflated signal cylinder of the present invention in its inflated condition.

A helium filled cannister 19 is received with a twisting motion into a valve assembly 19A of conventional construction which will puncture the end seal 21 of the cannister 19 filling and inflating the cylinder 10 with helium as best seen in FIG. 4. After the cylinder 10 has been filled with helium the cannister 19 is left in place to avoid leaking of the helium from the cylinder.

A tethering line 20 of any desired length of a nonconducting monofilament line is attached at one end through a grommet eyelet 21 through the tab 17 fused, cemented or otherwise secured about the base of the cylinder 10. There may be several tabs 17 secured circumferentially about the base of the cylinder 10 and Velcro patches 23 may be secured to the base between tabs 17 for securing complemental Velcro patches secured to radio frequency transmitting devices which emit rescue signals coded or constant pulse signals.

The tethering line 20 is wrapped about a plastic or card board or plastic cylinder 24 which performs a dual function of not only supporting a length of line 20 wrapped circumferentially about the cylinder 24 but it also forms a transport container for the cylinder 10 in a flat deflated rolled up condition but also supporting the helium cannister 19, as shown in FIG. 1, making a compact transportable life spotting distress signal device which may be conveniently stored in a back pack or other hiking type sack until an emergency arises requiring deployment and inflation of the cylinder 10 with helium.

Figure 5:
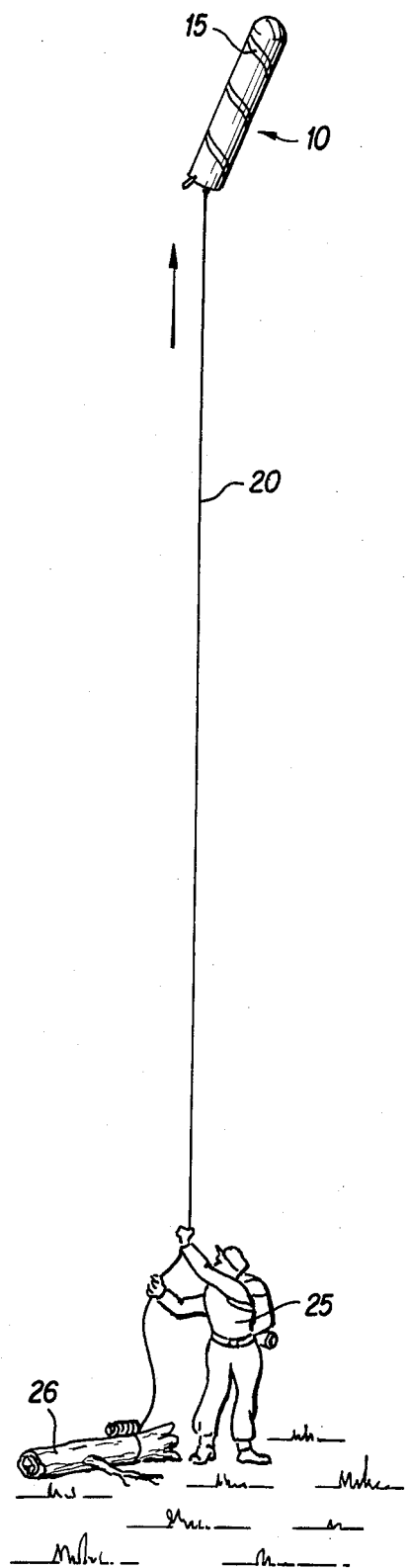
FIG. 5 is a view of a hiker deploying the cylindrical device of the present invention with the tether end secured to an anchor log.

As shown in FIG. 5 a hiker 25 is shown deploying a helium cylinder 10 for attracting a rescue effort and the lower end of the tether line 20 is securely anchored about a fallen tree 26 to fix the rescue spot without requiring the constant attention of the hiker or individual requiring medical attention or rescue.

IN OPERATION

When it becomes necessary to signal for help or medical assistance the signal device of FIGS. 1 and 2 in its nested compact condition is removed from a back pack and in a clearing and the package unit is unpacked as shown in FIG. 2. The loose end of the tether line 20 is secured to either the belt of the signaling person or a stationary object such as a tree. The cylinder 10 is unrolled as shown in FIG. 2 being careful not to puncture the cylinder 10. The helium cannister 19 is held in one hand and the inflatable cylinder 10 in the other hand. The cannister 19 is introduced to the valve unit 19A and given a quick twist to the right while thrusting the end seal 21 of the cannister into the valve unit 19A causing the end seal 21 to be punctured filling and inflating the cylinder 10 with enough helium to lift it to the height of its tether.

When the balloon 10 is full of helium and trying to rise the signaling units are attached to the tabs 17 or patches 18 and the tether line is unwound from the cylinder 24. The balloon 10 is allowed to rise above the trees or other objects which would obstruct its being seen by a would be rescue person or team. It is important once the signal balloon has been deployed that the person to be rescued be patient and remain with the unit until assistance arrives.

The signal balloon 10 may be made of state of the art plastics and mirror foils and the tether line 20 may be of monofilament or multifilament line.

What is claimed is:

1. A hiker's containerized compact transport life spotting package comprising a lighter than air inflatable cylinder shaped device of an international orange composite having an inflated diameter of the order of one foot in diameter and a length of the order of five feet, said cylinder shaped inflatable device being of a metallic foil over plastic composite and being radar reflective, the bottom of said cylinder shaped inflatable device having an apron for the attachment of signaling devices by way of grommet eyelets and Velcro patches, a mirror finish helical strip of highly light reflective material extending from the top of the cylinder and winding axially 360° down and around the cylinder to its bottom, a helium charged no return cannister, valve means for introducing helium from the cannister to the cylinder shaped inflatable device secured to the base of said device having means to puncture the top of the cannister and maintain a seal therewith while permitting the helium from the cannister to inflate the cylinder shaped device, a length of non-conductive line, one end of which is to be secured to the bottom of said inflatable cylinder shaped device and the other end of which is to be secured to a person to be rescued or an earth secured fixed object close thereto to locate and identify the subject to be rescued signalled by the airbourne cylindrical device, and a compact transport container retaining said cylinder shaped inflatable device in a flattened and rolled condition, said helium cannister, said valve means and said non-conductive line all nested coaxially with said transport container for transport by an individual over rough terrain.

* * * * *